(12) United States Patent
Chung

(10) Patent No.: US 12,018,845 B2
(45) Date of Patent: Jun. 25, 2024

(54) GRILL STOVE

(71) Applicant: ACEWILL CORPORATION, Apia (WS)

(72) Inventor: Kiosky Chung, Hong Kong (CN)

( * ) Notice: Subject to any disclaimer, the term of this patent is extended or adjusted under 35 U.S.C. 154(b) by 285 days.

(21) Appl. No.: 17/481,226

(22) Filed: Sep. 21, 2021

(65) Prior Publication Data

US 2023/0087324 A1 Mar. 23, 2023

(51) Int. Cl.
*F24C 15/18* (2006.01)
*A47J 37/07* (2006.01)

(52) U.S. Cl.
CPC .......... *F24C 15/18* (2013.01); *A47J 37/0704* (2013.01); *A47J 37/0786* (2013.01)

(58) Field of Classification Search
CPC ..... F24C 15/18; A47J 37/0704; A47J 37/0786
USPC ................................ 108/50.13, 152, 90, 79
See application file for complete search history.

(56) References Cited

U.S. PATENT DOCUMENTS

| | | | | |
|---|---|---|---|---|
| 4,899,725 A * | 2/1990 | Barron, Jr. | .......... | A47J 37/0713 126/41 R |
| 4,924,846 A * | 5/1990 | Peacock | .................. | F24C 15/06 126/41 R |
| 5,076,256 A * | 12/1991 | Raymer | .............. | A47J 37/0786 126/41 R |
| 5,076,257 A * | 12/1991 | Raymer | .............. | A47J 37/0786 126/41 R |
| 5,941,229 A * | 8/1999 | Schlosser | ............ | A47J 37/0713 126/41 R |
| 6,805,113 B2 * | 10/2004 | Stephen | .............. | A47J 37/0786 126/50 |
| 6,978,722 B2 * | 12/2005 | Home | .................. | A47B 17/003 126/41 R |
| 9,032,949 B2 * | 5/2015 | Nilssen | ............... | A47J 37/0786 126/41 R |
| 2008/0196709 A1* | 8/2008 | Davis | .................... | F21V 33/008 126/39 BA |
| 2018/0177337 A1* | 6/2018 | Prior | ........................ | G01N 3/56 |
| 2018/0235401 A1* | 8/2018 | Johnston | ............. | A47J 37/0786 |
| 2019/0343331 A1* | 11/2019 | Dahle | ................. | A47J 37/0713 |
| 2020/0187713 A1* | 6/2020 | Jin | ........................ | A47J 37/0647 |
| 2021/0315416 A1* | 10/2021 | Fullmer | .................. | F24C 15/12 |
| 2022/0046937 A1* | 2/2022 | Simon | ........................ | A23L 5/17 |
| 2022/0110488 A1* | 4/2022 | Hamann | ............. | A47J 37/0704 |
| 2022/0113032 A1* | 4/2022 | Jiang | ....................... | F24C 15/16 |
| 2022/0304506 A1* | 9/2022 | Bauerdick | ........... | A47J 37/0786 |

(Continued)

*Primary Examiner* — Jose V Chen
(74) *Attorney, Agent, or Firm* — Bruce Stone LLP; Joseph A. Bruce

(57) ABSTRACT

A grill stove contains: a body and an accommodation unit. The body includes a grill hold plate and a support rack which has a first fixer and a second fixer, and a hollow space is defined between the first fixer and the second fixer. The first fixer has at least one first receiving orifice, and the second fixer has at least one second receiving orifice. The accommodation unit includes an object holder and a quick release unit, and the object holder has a storage portion with an opening facing upward, a peripheral rib, a chamber, a partition, and at least one locating bolt. The quick release unit has a movable insertion, a spring, and a connection ring. The spring abuts against the partition, and the movable insertion has a cutout configured to receive the connection ring and to contact with a second end of the spring.

3 Claims, 5 Drawing Sheets

(56) References Cited

U.S. PATENT DOCUMENTS

2022/0304507 A1\* 9/2022 Simon .................. A47J 37/067
2022/0338674 A1\* 10/2022 He ...................... A47J 37/0713

\* cited by examiner

GRILL STOVE

FIELD OF THE INVENTION

The present invention relates to a grill stove which is capable of removing an object holding plate from a front end of a body of the grill stove quickly and easily.

BACKGROUND OF THE INVENTION

Conventional grill is to cook food on the fire until it is edible. Since most meat is cooked, grill is also called barbecue. In modern society, barbecue has become a multi-person gathering leisure and entertainment. With the diversification of barbecues, various grills have appeared on the market for consumers to use. However, when camping and grilling in the wild, in order to meet the needs of convenient carrying and storage, the barbecue has a style that can be assembled and disassembled. Most popular among consumers, and traditional detachable barbecue grills are focused on the assembly of the main structure, and did not focus on the storage of additional items. When engaging in outdoor barbecue activities, it is necessary to use seasoning sauce, shovel, clip, etc. For utensils such as knives and brushes, if the barbecue grill is equipped with a storage structure that is convenient for placing the barbecue utensils, it can attract consumers to buy the barbecue grill.

The present invention has arisen to mitigate and/or obviate the afore-described disadvantages.

SUMMARY OF THE INVENTION

The primary aspect of the present invention is to provide a grill stove which is capable of removing an object holding plate from a front end of a body of the grill stove quickly and easily.

To obtain the above mentioned aspects, a grill stove provided by the present invention contains: a body and an accommodation unit.

The body includes a grill hold plate and a support rack on which the grill hold plate is mounted, the support rack has a first fixer and a second fixer which are arranged on two sides of the support rack, and a hollow space is defined between the first fixer and the second fixer, the first fixer has at least one first receiving orifice formed thereon, and the second fixer has at least one second receiving orifice.

The accommodation unit includes an object holder and a quick release unit, the object holder is made of metal and has a storage portion with an opening facing upward, a peripheral rib extending rearward around the object holder, a chamber defined by the peripheral rib, a partition arranged in the chamber, and at least one locating bolt extending from a side of the peripheral rib of the object holder and accommodated in the at least one second receiving orifice of the second fixer.

The quick release unit has a movable insertion, a spring, and a connection ring, wherein the movable insertion is accommodated in the at least one first receiving orifice via the partition and the peripheral rib, the spring surrounds the movable insertion and is defined between the partition and the peripheral rib, wherein a first end of the spring abuts against the partition, and the movable insertion has a cutout configured to receive the connection ring and to contact with a second end of the spring, wherein a first end of the movable insertion is pushed by the spring to extend out of the peripheral rib, and a part of the movable insertion exposing outside the peripheral rib is pulled to retract into the chamber.

Thereby, the at least one locating bolt is inserted into the at least one second receiving orifice, and the part of the movable insertion is pulled to retract into the chamber so that the object holder is fixed on the support rack, and the movable insertion is released so as to be pushed by the spring to move into the at least one first receiving orifice, thus fixing the object holder. When desiring to remove the object holder, the movable insertion is retracted into the chamber so as to remove the object holder reversely.

The movable insertion further a pull grip bent on a second end thereof.

The object holder is removably connected with the storage portion, and the object holder has two slots defined on a front end thereof, wherein the storage portion has two L-shaped retainers extending upward from two sides thereof and engaged into the two slots.

Accordingly, the object holder is portable, fixed below, and remove from the body easily.

DETAILED DESCRIPTION OF THE PREFERRED EMBODIMENTS

Figure 1:
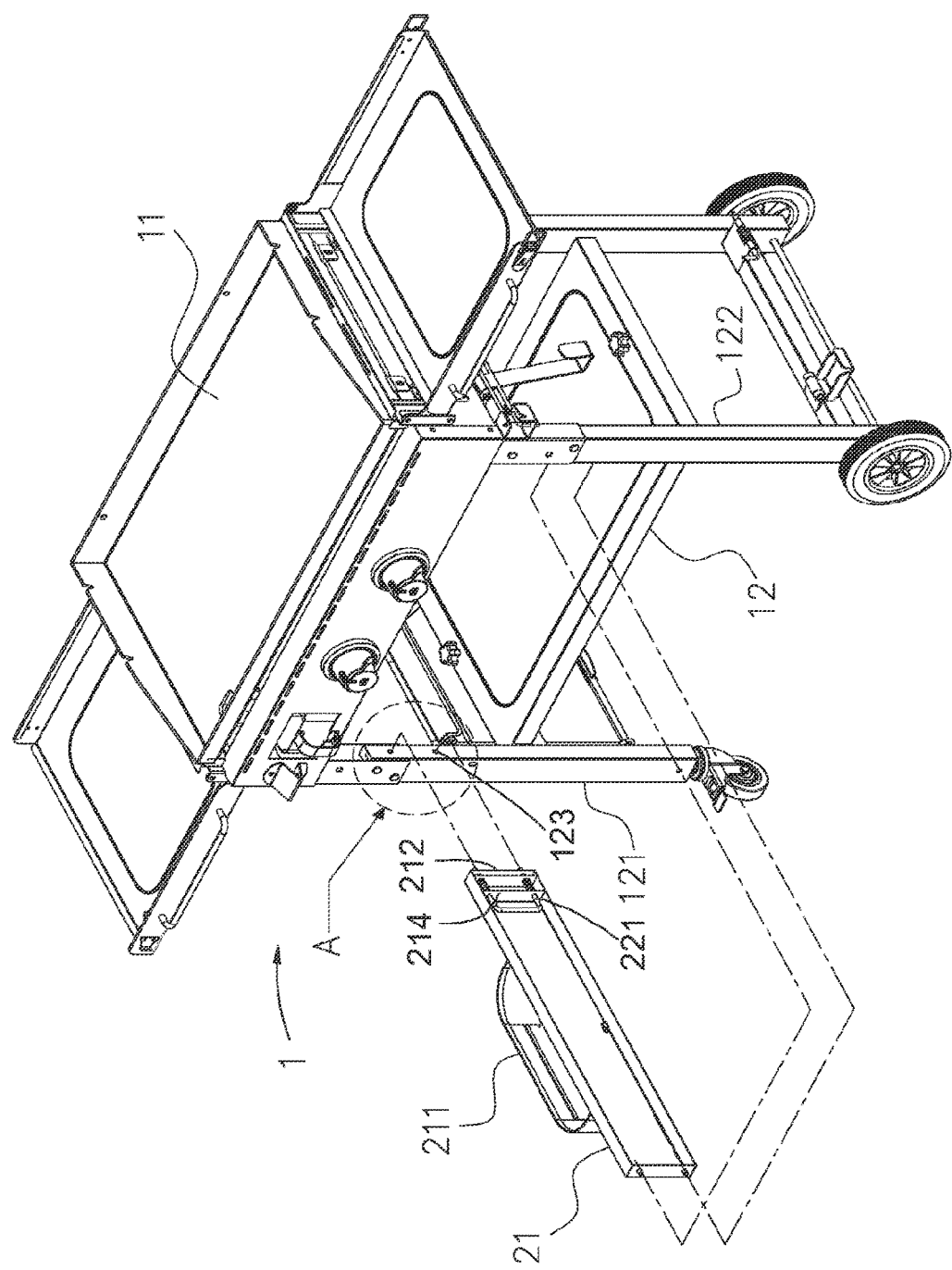
FIG. 1 is a perspective view showing the exploded components of a grill stove according to a preferred embodiment of the present invention.
Figure 2:
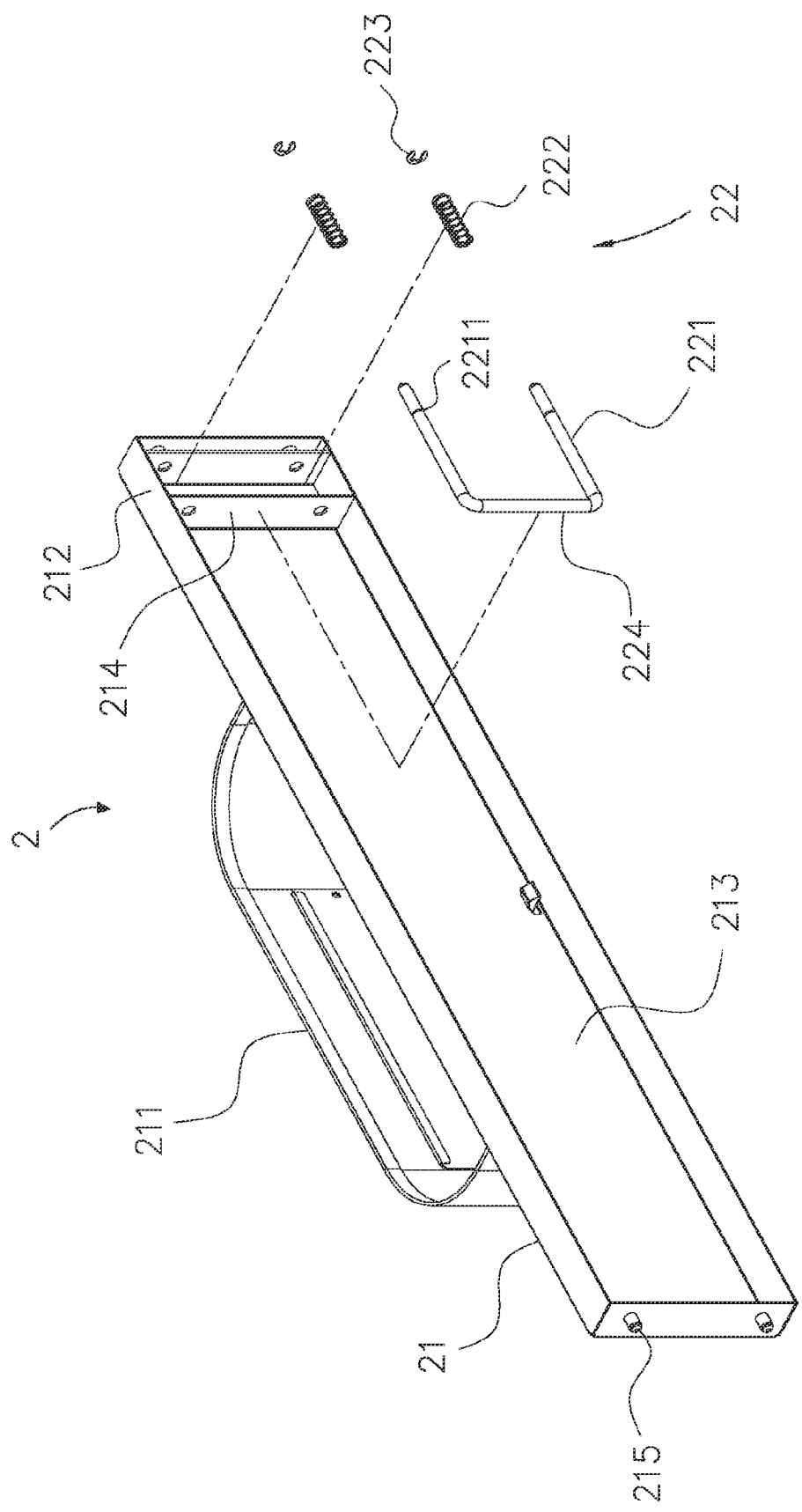
FIG. 2 is a perspective view showing the exploded components of a part of the grill stove according to the preferred embodiment of the present invention.
Figure 3:
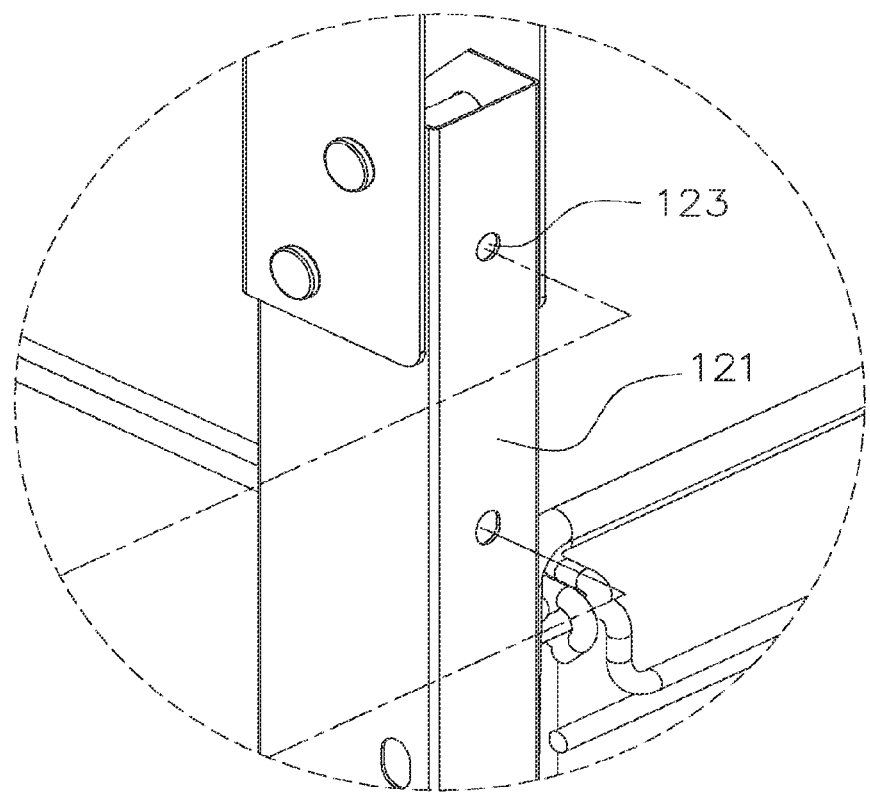
FIG. 3 is a perspective view showing the assembly of a part of the grill stove according to the preferred embodiment of the present invention.
Figure 4:
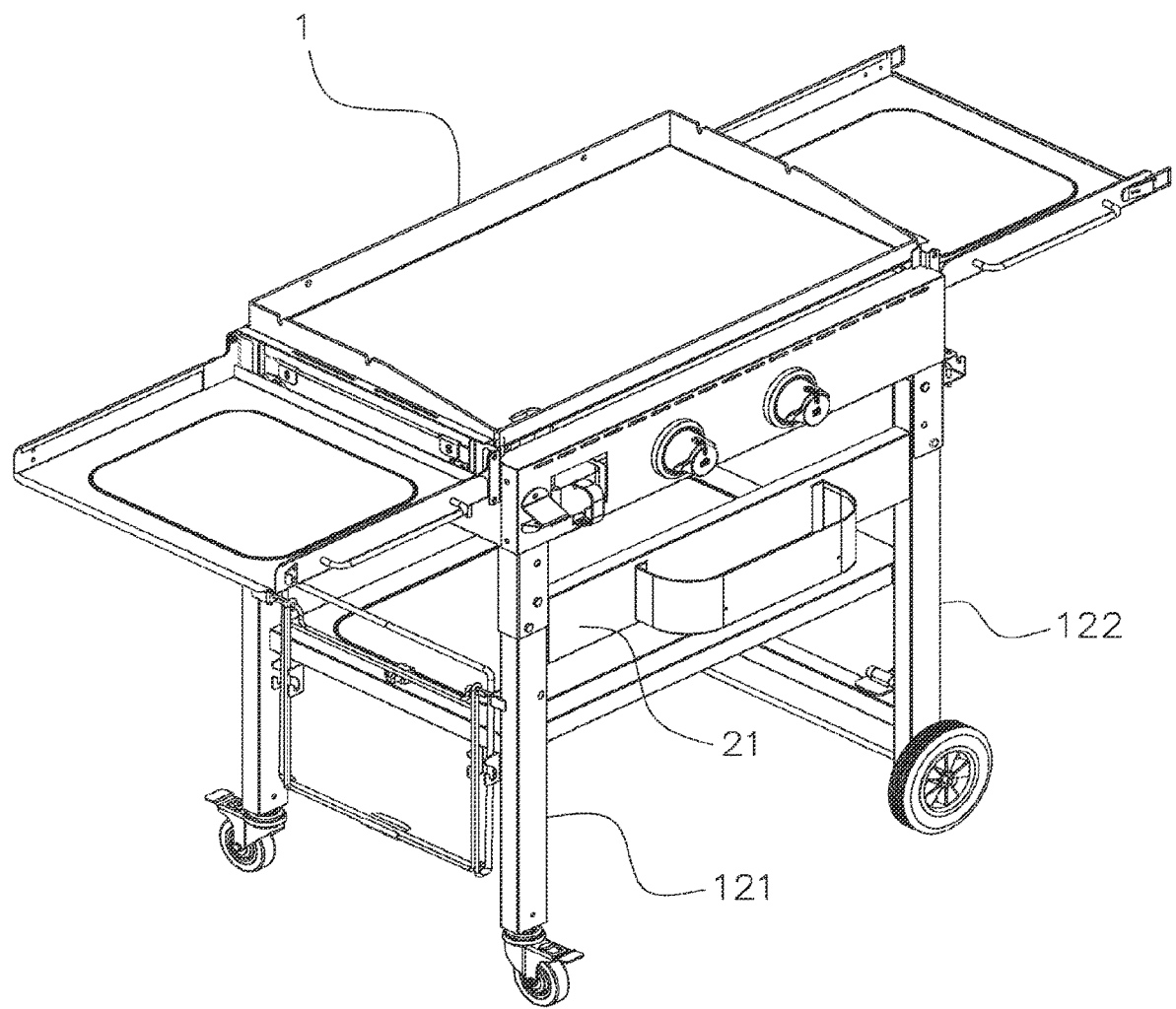
FIG. 4 is a perspective view showing the assembly of the grill stove according to the preferred embodiment of the present invention.

The present invention will be clearer from the following description when viewed together with the accompanying drawings, which show, for purpose of illustrations only, a preferred embodiment in accordance with the present invention.

With reference to FIGS. 1-4, a grill stove according to a preferred embodiment of the present invention is capable of removing an object holder from a front end of a body of the grill stove quickly and easily. The grill stove comprises the body 1 and an accommodation unit 2.

The body 1 includes a grill hold plate 11 and a support rack 12 on which the grill hold plate 11 is mounted, wherein the support rack 12 has a first fixer 121 and a second fixer 122 which are arranged on two sides of the support rack 12, and a hollow space is defined between the first fixer 121 and the second fixer 133. The first fixer 121 has at least one first receiving orifice 123 formed thereon, and the second fixer 122 has at least one second receiving orifice. Since the at least one second receiving orifice correspond to the first receiving orifice, so they are omitted in drawings.

The accommodation unit 2 includes the object holder 21 and a quick release unit 22, wherein the object holder 21 is made of metal and has a storage portion 211 with an opening facing upward, a peripheral rib 212 extending rearward around the object holder 21, a chamber 213 defined by the peripheral rib 212, a partition 214 arranged in the chamber 213, and at least one locating bolt 215 extending from a side of the peripheral rib 212 of the object holder 21 and accommodated in the at least one second receiving orifice of the second fixer 122.

The quick release unit 22 has a movable insertion 221, a spring 222, and a connection ring 223, wherein the movable insertion 221 is accommodated in the at least one first receiving orifice 123 via the partition 214 and the peripheral rib 212, the spring 222 surrounds the movable insertion 221 and is defined between the partition 214 and the peripheral rib 212, wherein a first end of the spring 222 abuts against the partition 214, and the movable insertion 221 has a cutout 2211 configured to receive the connection ring 223 and to contact with a second end of the spring 222, wherein a first end of the movable insertion 221 is pushed by the spring 222 to extend out of the peripheral rib 212, and a part of the movable insertion 221 exposing outside the peripheral rib 212 is pulled to retract into the chamber 213.

Thereby, the at least one locating bolt 215 is inserted into the at least one second receiving orifice, and the part of the movable insertion 221 is pulled to retract into the chamber 213 so that the object holder 21 is fixed on the support rack 12, and the movable insertion 221 is released so as to be pushed by the spring 222 to move into the at least one first receiving orifice 123, thus fixing the object holder 21. When desiring to remove the object holder 21, the movable insertion 221 is retracted into the chamber 213 so as to remove the object holder 21 reversely.

The movable insertion 221 further a pull grip 224 bent on a second end thereof and configured to fix and remove the object holder 21 easily.

Figure 5:
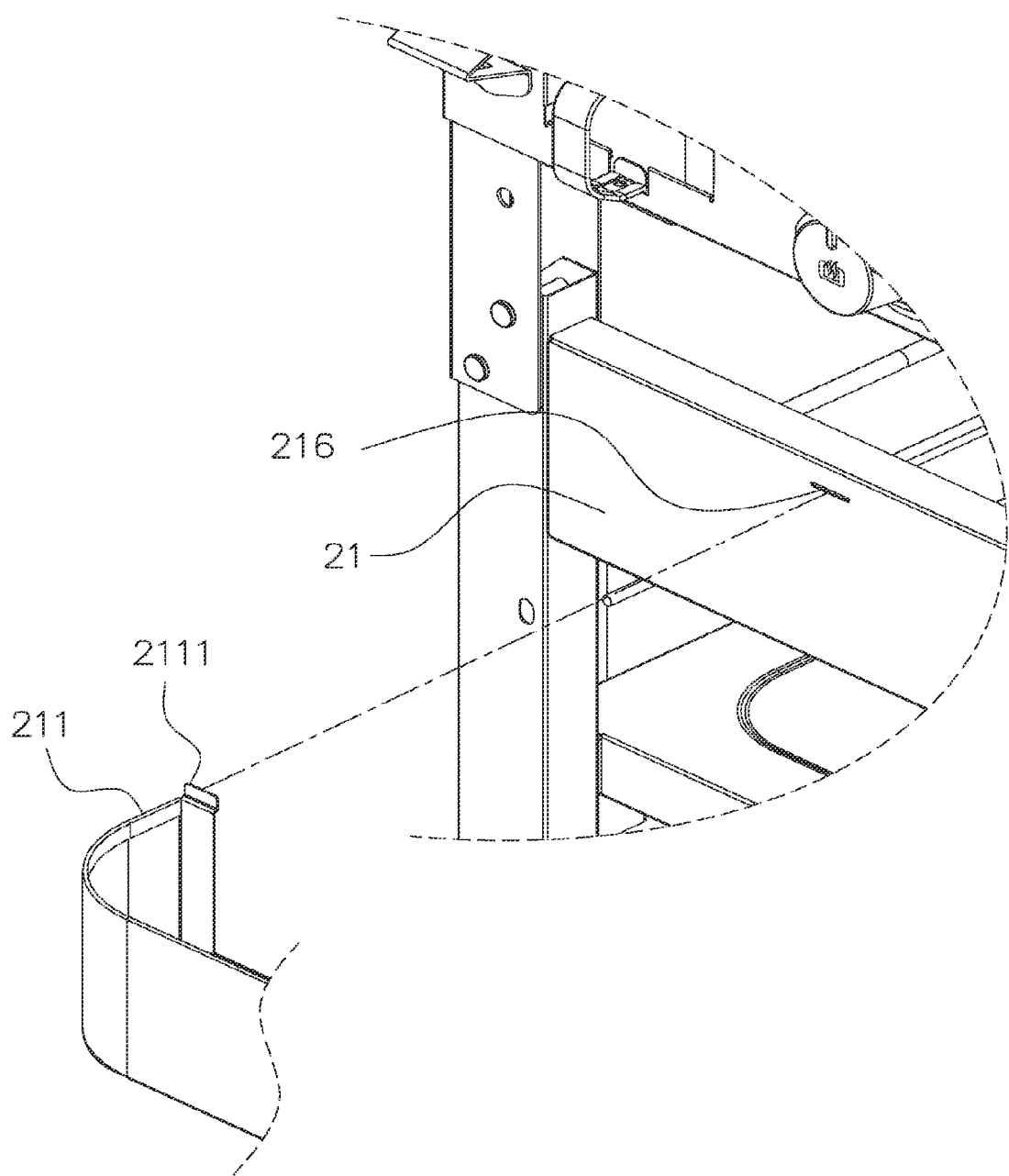
FIG. 5 is a perspective view showing the operation of the grill stove according to the preferred embodiment of the present invention.

Referring to FIG. 5, the object holder 21 is removably connected with the storage portion 211, and the object holder 21 has two slots 216 defined on a front end thereof. The storage portion 211 has two L-shaped retainers 2111 extending upward from two sides thereof and engaged into the two slots 216.

Accordingly, the object holder 21 is portable, fixed below, and remove from the body 1 easily.

While various embodiments in accordance with the present invention have been shown and described, it is clear to those skilled in the art that further embodiments may be made without departing from the scope of the present invention.

What is claimed is:

1. A grill stove comprising: a body and an accommodation unit;

wherein the body includes a grill hold plate and a support rack on which the grill hold plate is mounted, the support rack has a first fixer and a second fixer which are arranged on two sides of the support rack, and a hollow space is defined between the first fixer and the second fixer, the first fixer has at least one first receiving orifice formed thereon, and the second fixer has at least one second receiving orifice;

wherein the accommodation unit includes an object holder and a quick release unit, the object holder is made of metal and has a storage portion with an opening facing upward, a peripheral rib extending rearward around the object holder, a chamber defined by the peripheral rib, a partition arranged in the chamber, and at least one locating bolt extending from a side of the peripheral rib of the object holder and accommodated in the at least one second receiving orifice of the second fixer;

wherein the quick release unit has a movable insertion, a spring, and a connection ring, wherein the movable insertion is accommodated in the at least one first receiving orifice via the partition and the peripheral rib, the spring surrounds the movable insertion and is defined between the partition and the peripheral rib, wherein a first end of the spring abuts against the partition, and the movable insertion has a cutout configured to receive the connection ring and to contact with a second end of the spring, wherein a first end of the movable insertion is pushed by the spring to extend out of the peripheral rib, and a part of the movable insertion exposing outside the peripheral rib is pulled to retract into the chamber.

2. The grill stove as claimed in claim 1, wherein the movable insertion further a pull grip bent on a second end thereof.

3. The grill stove as claimed in claim 1, wherein the object holder is removably connected with the storage portion, and the object holder has two slots defined on a front end thereof, wherein the storage portion has two L-shaped retainers extending upward from two sides thereof and engaged into the two slots.

* * * * *